United States Patent Office 2,714,595
Patented Aug. 2, 1955

2,714,595

DERIVATIVES OF ISONICOTINIC ACID-1-OXIDES

Jack Bernstein and Kathryn A. Losee, New Brunswick, N. J., assignors to Olin Mathieson Chemical Corporation, a corporation of Virginia No Drawing. Application September 18, 1952,
Serial No. 310,374

6 Claims. (Cl. 260—295)

This invention relates to, and has for its object the provision of, certain derivatives of isonicotinic acid-1-oxides and methods for their preparation. These compounds are valuable chemotherapeutic agents, having antimycobacterial (especially antituberculous) properties. The compounds of this invention are the hydrazides of isonicotinic acid-1-oxides (in both free-base and acid-addition salt form).

The hydrazides of isonicotinic acid-1-oxides (as well as the intermediates therefor and derivatives thereof) may be unsubstituted in the (isonicotinic acid) nucleus or contain nuclear substituents, such as hydrogen, lower alkyl or alkoxy in the 2-position, and/or hydrogen, lower alkyl, alkoxy or halo in the 3-position.

The synthesis of hydrazides of isonicotinic acid-1-oxides may be carried out by first treating the selected isonicotinic acid with an N-oxidizing agent, such as hydrogen peroxide, peracetic acid, perbutyric acid, perbenzoic acid etc., to form the corresponding isonicotinic acid-1-oxide, esterifying the oxide by treating with a lower alkanol, such as methanol or ethanol (preferably methanol), and treating the resulting ester with hydrazine hydrate to form the hydrazide of the isonicotinic acid-1-oxide. Alternatively, the isonicotinic acid may first be esterified with the lower alkanol, and the ester then oxidized to the 1-oxide prior to reaction with the hydrazine hydrate.

Acid-addition salts may be obtained by the usual methods. Thus, salts with hydrochloric acid may be formed in aqueous solution or under anhydrous conditions, for example, by passing hydrogen chloride gas into an ethereal solution of the free base; and other salts, such as those of sulfuric acid, phosphoric acid, p-aminosalicylic acid, p-toluenesulfonic acid, methionine, sulfamic acid, lactic acid, citric acid, gluconic acid, etc. may be formed by the conventional treatments.

The compounds of this invention may be prepared for use by association of a therapeutically-active quantity (at least 0.1%) of the agent with a carrier which is preferably a solid material, but which may be a sterile liquid vehicle or a liquid pharmaceutical carrier, such as a syrup. Thus, the formulations may take the form of tablets, powder packets, capsules, or other dosage-unit forms which are useful for oral administration. These may be prepared in the conventional manner. For example, two-piece gelatin capsules may be made containing a mixture of the hydrazide and excipient (e. g., starch, talc, stearic acid, magnesium stearate), the agent being present in an amount of the order of about 10 to 100 mg. or more. Also, one-piece gelatin capsules may be prepared containing the desired dosage (e. g., of the order of 10 to 100 mg. or more) of the agent in sufficient corn oil to render the compound capsulatable. Tablets may be prepared to contain of the order of 10 to 250 mg. or more of the agent using starch, lactose or other conventional excipient, and may be scored to enable one to take fractional dosages, if desired. Any of the tableting materials used in pharmaceutical practice may be employed where there is no incompatibility with the particular agent.

The agent may also be prepared in liquid (solution or suspension) form. Thus, a composition may be prepared to contain about 5 mg. or more of the agent per ml. of liquid pharmaceutical carrier, such as a carbohydrate-containing (e. g., syrup) or an aqueous-alcoholic vehicle. Or a sterile parenteral solution may be prepared, for example, by dissolving the agent in water (e. g., about 100 mg./ml.), adding a preservative, such as chlorbutanol (5 mg./ml.), and then ampuling or packaging in multidose vials and sterilizing.

In all compositions where such excipient as lactose is used, sugar-alcohols, such as sorbitol or mannitol, may be substituted.

In addition to their use in man, the agents of this invention may be used with similar therapeutic effect in animals, such as poultry and cows. For such use, they may take the form of animal feed compositions, such as poultry feed compositions containing at least 0.1 per cent of the agent and a significant amount of nutritive material.

Following are specific working examples illustrative of the manner in which the compounds of this invention may be prepared:

EXAMPLE 1

Methyl isonicotinate-1-oxide (a) To a solution of 27.4 g. methyl isonicotinate in 200 ml. glacial acetic acid is added, dropwise, 35 g. peracetic acid (40%). The mixture is then heated on a steam bath for five hours and the resulting mixture is concentrated to dryness under reduced pressure at 50° C. The crystalline residue is triturated with dry ethyl ether, then separated by filtration to yield about 24 g. (80% yield) of product. On recrystallization from a mixture of 100 ml. absolute ethanol and 150 ml. dry ether, a purified methyl isonicotinate-1-oxide (M. P. 118–119° C.) is obtained.

(b: Alternate method) A solution of 27.8 g. isonicotinic acid-1-oxide in 500 ml. absolute methanol is saturated with hydrogen chloride at 0° C., then refluxed for 2 hours. The unreacted methanol is separated by distillation and the residue is dissolved in 200 ml. water and adjusted to pH 8.5 with sodium carbonate. The ester is then extracted from the alkaline solution using three 500 ml. portions of chloroform. The extract is dried using anhydrous magnesium sulfate and the chloroform then distilled off. The residue is recrystallized from ethanol-hexane to yield a purified methyl isonicotinate-1-oxide (M. P. 118–119° C.).

Employing ethyl or other lower alkyl isonicotinates in a, or ethanol or other lower alcohols in b, the corresponding lower alkyl isonicotinate-1-oxide is obtained.

EXAMPLE 2

Isonicotinic acid-1-oxide hydrazide

To a solution of 19 g. methyl isonicotinate-1-oxide in 75 ml. dry methanol is added 7.4 g. hydrazine hydrate (85%). A slight evolution of heat is observed and crystallization occurs after about 5 minutes' agitation. The solid material is separated by filtration then washed with dry ethyl ether to yield 18 g. of product. On recrystallization from a liter of 95% ethanol, the purified isonicotinic acid-1-oxide hydrazide (M. P. 218–219° C.dec.) is obtained. The product may be depicted by the following structural formula:

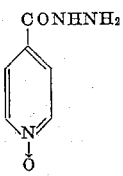

EXAMPLE 3

*Methyl 3-methoxyisonicotinate-1-oxide*

(a) To a suspension of 27.8 g. 3-hydroxyisonicotinic acid in 500 ml. anhydrous ether there is added dropwise, with vigorous stirring, a solution of 21 g. diazomethane in 500 ml. anhydrous ether. The reaction mixture is allowed to remain overnight at room temperature. The excess diazomethane is then decomposed by the addition of acetic acid. The ether solution remaining is washed with 200 ml. 5% sodium hydroxide solution, dried over anhydrous magnesium sulfate, then concentrated on a steam bath to leave a residue of crude methyl 3-methoxyisonicotinate which is purified by distillation under reduced pressure.

(b) To a solution of 25 g. methyl 3-methoxyisonicotinate in 200 ml. glacial acetic acid there is added dropwise, with stirring, 35 g. 40% peracetic acid. The reaction mixture is heated for five hours on a steam bath, then allowed to remain overnight at room temperature. The solution is then concentrated to dryness under reduced pressure and the residue triturated with anhydrous ether and filtered. The crude ester is purified by crystallization from methyl alcohol.

EXAMPLE 4

*3-methoxyisonicotinic acid-1-oxide hydrazide*

To a solution of 18.3 g. methyl 3-methoxyisonicotinate-1-oxide in 100 ml. dry methanol, there is added 6.0 g. 85% hydrazine hydrate. The mixture is refluxed for one hour after the initial reaction has subsided and the methyl alcohol then removed by distillation under reduced pressure. The residue is crystallized from 95% ethanol to give the purified 3-methoxyisonicotinic acid-1-oxide hydrazide.

EXAMPLE 5

*Methyl 2-propoxyisonicotinate-1-oxide*

To a solution of 29.3 g. methyl 2-propoxyisonicotinate, prepared by treatment of an ethereal suspension of the acid with an ethereal solution of diazomethane, in 200 ml. glacial acetic acid there is added gradually 35 g. 40% peracetic acid. The reaction mixture is heated on a steam bath for six hours and then concentrated under reduced pressure to give a solid residue, which is suspended in anhydrous ether and filtered. The product is purified by crystallization from methyl alcohol-ether mixture.

EXAMPLE 6

*2-propoxyisonicotinic acid-1-oxide hydrazide*

21.1 g. methyl 2-propoxyisonicotinate-1-oxide is dissolved in 100 ml. dry methanol and 6.0 g. 85% hydrazine hydrate is added. After the initial reaction has subsided, the mixture is refluxed for one hour and the alcohol then removed under reduced pressure. The residue, 2-propoxyisonicotinic acid-1-oxide hydrazide, is purified by crystallization from ethyl alcohol.

EXAMPLE 7

*Methyl 3-chloroisonicotinate-1-oxide*

(a) To a suspension of 78.7 g. 3-chloroisonicotinic acid in 1500 ml. anhydrous ether is added dropwise, with stirring, a solution of 21 g. diazomethane in 500 ml. anhydrous ether at room temperature. This resulting mixture is washed with two 300 ml. portions of 5% sodium carbonate solution and the ether layer dried over magnesium sulfate. The ether is distilled off and the residue, methyl 3-chloroisonicotinate, is purified by fractional distillation under reduced pressure.

(b) A solution of 34.3 g. methyl 3-chloroisonicotinate and 35 g. 40% peracetic acid in 200 ml. glacial acetic acid is heated on a steam bath for five hours. The solution is concentrated to dryness under reduced pressure and the residue triturated with anhydrous ether to yield a solid residue. The product, methyl 3-chloroisonicotinate-1-oxide, is purified by crystallization from absolute alcohol.

EXAMPLE 8

*3-chloroisonicotinic acid-1-oxide hydrazide*

A solution of 18.8 g. methyl 3-chloroisonicotinate-1-oxide and 6 g. 85% hydrazine hydrate in 300 ml. absolute methanol is refluxed for three hours on a steam bath. The mixture is cooled and the solid residue is filtered off and washed with ether. The product, 3-chloroisonicotinic acid-1-oxide hydrazide, is purified by recrystallization from 90% alcohol.

EXAMPLE 9

*Ethyl 3-methylisonicotinate-1-oxide*

(a) A solution of 89.7 g. 3-methylisonicotinic acid in 250 ml. absolute ethanol containing 75 ml. concentrated sulfuric acid is refluxed for two and one-half hours on a steam bath. The reaction mixture is poured onto 700 g. of cracked ice, made alkaline (pH 10) with about 500 ml. of 25% sodium hydroxide, then extracted twice with 350 ml. portions of anhydrous ether. The aqueous layer is saturated with potassium carbonate, then extracted with 500 ml. of anhydrous ether. The combined ether extracts are dried over magnesium sulfate and the ether distilled off. The residue is fractionated yielding 38 g. of ethyl 3-methylisonicotinate.

(b) A solution of 33 g. ethyl 3-methylisonicotinate and 35 g. 40% peracetic acid in 200 ml. of glacial acetic acid is heated for 5 hours on a steam bath. The solution is concentrated to dryness under reduced pressure and the solid residue triturated with dry ether to yield the ester. The product, ethyl 3-methylisonicotinate-1-oxide, is purified by recrystallization from absolute alcohol.

EXAMPLE 10

*3-methylisonicotinic acid-1-oxide hydrazide*

A solution of 18.1 g. ethyl 3-methylisonicotinate-1-oxide and 6 g. 85% hydrazine hydrate in 300 ml. absolute ethanol is refluxed for 3 hours on a steam bath. Upon cooling, crystals form, which are filtered off and washed with ether. The product, 3-methylisonicotinic acid-1-oxide hydrazide, is purified by recrystallization from 90% alcohol.

EXAMPLE 11

*Ethyl 2-ethylisonicotinate-1-oxide*

(a) A solution of 75.5 g. 2-ethylisonicotinic acid in 250 ml. absolute ethanol containing 75 ml. concentrated sulfuric acid is refluxed on a steam bath for 3 hours. The reaction mixture is poured onto 700 g. cracked ice, made alkaline with 400 ml. of 25% sodium hydroxide and extracted twice with 300 ml. portions of ether. The aqueous layer is saturated with potassium carbonate and extracted with 500 ml. anhydrous ether. The ether extracts are dried over magnesium sulfate and the ether distilled off. The product, ethyl 2-ethylisonicotinate, is purified by distillation under reduced pressure.

(b) A solution of 35.8 g. ethyl 2-ethylisonicotinate and 35 g. 40% peracetic acid in 200 ml. glacial acetic acid is heated on a steam bath for 5 hours. The solution is concentrated to dryness under reduced pressure, and the residue triturated with dry ether to yield a crystalline solid, ethyl 2-ethylisonicotinate-1-oxide.

EXAMPLE 12

*2-ethylisonicotinic acid-1-oxide hydrazide*

A solution of 19.5 g. ethyl 2-ethylisonicotinate-1-oxide and 6 g. 85% hydrazine hydrate in 300 ml. ethanol is refluxed on a steam bath for 3 hours. A crystalline solid forms during the heating. The mixture is cooled, and the solid filtered off and washed with anhydrous ether. The product, 2-ethylisonicotinic acid-1-oxide hydrazide, is purified by recrystallization from 90% alcohol.

This invention may be variously otherwise embodied within the scope of the appended claims.

We claim:

1. A compound of the group consisting of: the hydrazides of isonicotinic acid-1-oxides having the structural formula

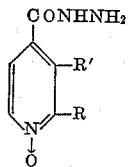

wherein R is a member of the group consisting of hydrogen, lower alkyl, and (lower alkyl)-oxy, and R' is a member of the group consisting of hydrogen, lower alkyl, (lower alkyl)-oxy, and halo; and their acid-addition salts.

2. 3-(lower alkyl)-oxy-isonicotinic acid-1-oxide hydrazide.

3. 2-(lower alkyl)-oxy-isonicotinic acid-1-oxide hydrazide.

4. 3-haloisonicotinic acid-1-oxide hydrazide.

5. (Lower alkyl) isonicotinic acid-1-oxide hydrazide, wherein the lower alkyl group is in one of the positions 2 and 3.

6. Isonicotinic acid hydrazide-N-oxide having the formula:

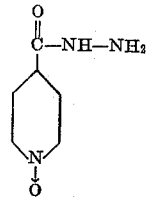

References Cited in the file of this patent

Chem. Abstracts vol. 37, pp. 4734–35 (1943).

Meyer et al., Monatshefte für Chemie, vol. 33, pp. 393–414 (1912).

Meyer et al., Monatshefte für Chemie, vol. 36, pp. 731–749 (1915).

Graf, J. Prakt Chemie, vol. 133, pp. 24 and 25 (1932).